US006611195B1

(12) United States Patent
Manneschi et al.

(10) Patent No.: US 6,611,195 B1
(45) Date of Patent: Aug. 26, 2003

(54) IDENTIFYING PROCESS AND AN AUTOMATICALLY OPERATED BOOTH EQUIPPED WITH INTERBLOCKING DOORS

(76) Inventors: Alessandro Manneschi, 15 Via XXV Aprile, I-52100 Arezzo (IT); Luca Manneschi, 14 Via Lampredi, I-50134 Florence (IT)

( * ) Notice: Subject to any disclaimer, the term of this patent is extended or adjusted under 35 U.S.C. 154(b) by 0 days.

(21) Appl. No.: 09/348,244

(22) Filed: Jul. 6, 1999

(30) Foreign Application Priority Data

Mar. 4, 1999 (IT) ........................................ AR99A0003

(51) Int. Cl.[7] ........................... G05B 23/00; G06F 7/00; G06K 19/00; D08B 29/00

(52) U.S. Cl. ....................... 340/5.52; 340/5.53; 340/5.7

(58) Field of Search .............................. 340/5.52, 5.53, 340/572.1, 572.2, 545.1, 5.7, 5.73; 109/9; 382/115

(56) References Cited

U.S. PATENT DOCUMENTS

| | | | | |
|---|---|---|---|---|
| 4,498,033 A | * | 2/1985 | Aihara et al. | 318/261 |
| 5,099,227 A | * | 3/1992 | Geiszler | 340/572 |
| 5,400,722 A | * | 3/1995 | Moses et al. | 109/2 |
| 5,831,533 A | * | 11/1998 | Kanno | 340/573 |
| 6,353,472 B1 | * | 3/2002 | Bault | 356/71 |

FOREIGN PATENT DOCUMENTS

| | | |
|---|---|---|
| DE | 3731773 | 5/1989 |
| EP | 0225196 | 6/1987 |
| EP | 0599291 | 6/1994 |
| EP | 0924655 | 6/1999 |
| FR | 2368765 | 5/1978 |
| FR | 2571419 | 4/1986 |
| FR | 2603406 | 3/1988 |
| FR | 2761181 | 9/1998 |

* cited by examiner

*Primary Examiner*—Michael Horabik
*Assistant Examiner*—Vernal Brown
(74) *Attorney, Agent, or Firm*—Dennison, Schultz & Dougherty

(57) ABSTRACT

An identifying process and a booth provided with interblocking doors operated in accordance with the process. The booth is provided with a weighing mechanism and a biometric reader placed inside of the booth, which operates in conjunction with a programmed logic unit. Critical information relating to the person who seeks to pass through the booth to a secured area is transmitted from a data card carried by the person to the programmed logic unit from an identity card reading unit, from a reading of the weight of the person and from reading of biometric data, so that after comparison of the data with that on the person's identify card, the programmed logic unit will verify if the person in transit is to be permitted entry and then command the opening and closing of the interblocking doors of the booth as well as any other desired apparatus.

6 Claims, 2 Drawing Sheets

IDENTIFYING PROCESS AND AN AUTOMATICALLY OPERATED BOOTH EQUIPPED WITH INTERBLOCKING DOORS

BACKGROUND OF THE INVENTION

The present invention concerns an identifying process and a booth equipped with interblocking doors operated automatically according to the aforesaid process, and which guarantees the passage of one authorized person at a time, and it is designed for security and for controlling the entrance of places where only authorized people are allowed to enter.

Existing booths have one entrance door and one exit door which are interblocking, i.e. only one of the two can be opened at a time. The doors are activated by a guard placed inside the protected area, in a booth, or even far from the entrance, who in any case has a constant view of the controlled space through a closed circuit surveillance system.

This system is expensive because the control of the access must be operated by personnel; furthermore, it is not considered safe because if said personnel should be controlled by ill-intentioned individuals, it would leave the control of the access in their hands, with obvious consequences.

Another existing booth, Italian Patent Application no. AR94A00011 by Alessandro Manneschi, is equipped with a metal detector and an induction card detector, it is adequate to allow the access to the protected area to all those people who do not carry arms, or metal equipment similar to arms. When authorized people, carrying a recognized induction card, are allowed to pass the metal detector is de-activated or its sensitivity is reduced in order to limit false alarms at their passage, therefore the passage through the controlled entrance becomes more rapid. This type of booth does not carry out a thorough control of the identity of the persons carrying the induction cards, who could be different from their legitimate owners. Therefore, this booth is perfect to facilitate traffic through those passages where a very strict check of the people passing through the booth is not necessary.

Another type of existing booth, with the same interblocking doors, requires a button to request the opening of the door, or a digit panel on which to digit an access code or a card reader, the code or cards being owned only by authorized personnel.

Therefore, the existing systems are a metal detector which blocks the entrance of people carrying metal masses similar to arms, a weighing mechanism which is aimed at ensuring the passage of one person at a time (antihostage and antiescort system), and finally a system based on verifying one's identity consisting of a digit panel on which a personal access code is digited, or even a biometric sensor to read the finger print or hand print of the person that has to access the protected area.

The said type of booth, although complex, does have a number of inconveniences and cannot be considered completely safe. In one case it requires the activation of manually operated commands at the entrance which allow anyone to enter the booth, in another case it requires the use of magnetic cards or a digit panel and codes to limit the access to authorized people only. However, in these last cases ill-intentioned people can always recognize those people who are authorized to enter, obtain their cards or codes in order to pass through the booth.

Said booths are equipped with a weighing system which is normally set at a limit of 120–140 kg, which is an antihostage and antiescort system, and in any case allows the passage of light weight couples, without carrying out the functions for which it is made.

The digit panel inside the booth on which a personal secret code is digited, does not guarantee that the person digiting it is the same authorized person and not an ill-intentioned person who, after threatening the victim, has obtained the secret code from an authorized person.

If the identifying mechanism inside the booth is biometric, it normally involves the physical contact of all authorized people with special reference surfaces. This system is strongly criticised and identifies only one person at a time and not an eventual accompanying person in the case in which the weight of both should amount to less than the one set on the weighing system which precedes the biometric reading step.

SUMMARY OF THE INVENTION

The aim of this invention is to create an identifying process and a booth with one entrance door and one exit door that are interblocking. The booth is commanded by the above mentioned process in order to guarantee that only one person at a time is allowed to walk through it and also that the person's identity be certain, furthermore it has minimal operating costs. The invention therefore is aimed at:

- ensuring access to the protected area only to those who are authorized;
- allowing access to one person at a time in total security (antihostage and antiescort functions);
- verifying the identity of the person in transit with the authorized ones;
- making the operation of the booth completely automatic, and preferably structured so that it can be operated free-of-hands, that is without requiring, at least at the entrance, the authorized people to activate any mechanical means as digit panels or readers, so that ill-intentioned people will not be able to identify them.

Such a device to control the passage is better than a booth with interblocking doors and guards operating the commands from a control panel from where the doors of the booth are commanded, with an increase in security and a reduction of operating costs that are easily understood.

The invention that can reach said results consists of a process to identify the people authorized to transit through a controlled passage and of the means with which the process is carried out. It consists of a booth structure, usually armoured, having two interblocking doors equipped to read the identification code of the person passing through the booth, and of a weighing device which can measure the weight of the person or persons inside the booth when it is closed, and of a biometric reader combined with a programmed logic Unit, placed anywhere, that can command the doors of the booth and any other mechanism, having memorized at the very least the identity codes, the weight and biometric data of the people authorized to enter. The programmed logic Unit operates the controls by comparing the previously memorized information inside it with the one transmitted by the means placed at the entrance of the booth by receiving the identity code of the people authorized to enter and the information supplied by the weighing system and also the one given by the biometric reader inside the booth.

An identifying process and a booth equipped and commanded as such are especially advantageous because:

- access is allowed only to the person owning the card with the authorized code. The reading of the person's weight inside the booth and its comparison to the memorized one corresponding to the code that has determined the access to the booth, ensure the presence inside the booth of only one person whose weight is equal to the one of the authorized person whose assigned code has allowed entrance to the booth, or to more than one person whose total weight is equal to the one of the person owning the code that has activated the opening of the booth;

the correspondence of the information transmitted by the biometric reader to the one memorized with the name of the holder of the code that has activated the process, ensures that only the code holder who has activated the booth is present within the booth and therefore is allowed to enter the protected area; finally, the use at the entrance of an electromagnetic wave device, (antennas for the reading of induction cards), determines the opening of the door to the booth only when the user holding an authorized induction card is near the door, so that no physical action is necessary on the part of the authorized person in order to enter the booth and therefore is not recognizable by ill-intentioned people; and after the entry door is opened, the activation of the weight device commences, so that when the person crosses the entry door and is weighed on the floor inside the booth, a second reading is made in order to verify that the person entering the booth is the one carrying the authorized card and not someone else, then the closing of the entry door commences. Accordingly, the first reading activates the opening of the entry door of the booth and the second reading, if it coincides with the first one, activates the closing of the entry door.

The process, object of this invention, and the booth, comprising all its functional parts, ensure an absolute certainty of the identity of each person passing through the booth to access the protected area.

BRIEF DESCRIPTION OF THE DRAWINGS

The operating logic and the functional structure of this invention are easily understood by following the detailed description herebelow which refers to the preferred realization of the booth, and to the flow chart exemplified in the reproduced drawings in the enclosed tables, in which.

DESCRIPTION OF THE PREFERRED EMBODIMENT

Figure 1:
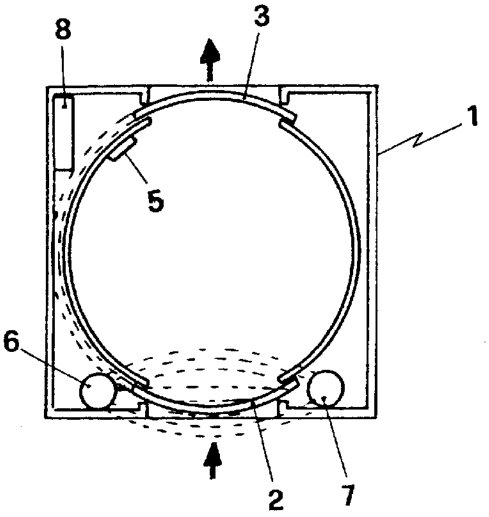
FIG. 1 is the view from the top of the sketched structure of the booth, in a situation in which the doors are curved, sliding panels.
Figure 2:
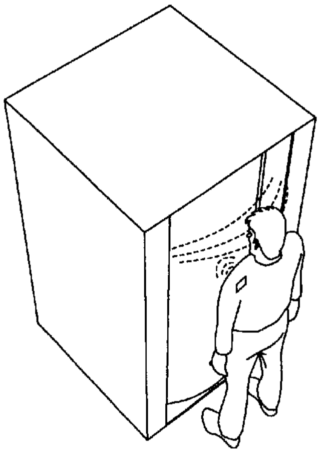
FIG. 2 is the perspective view from the top of the booth and the person authorized to enter in the position in which the opening is activated.
Figure 3:
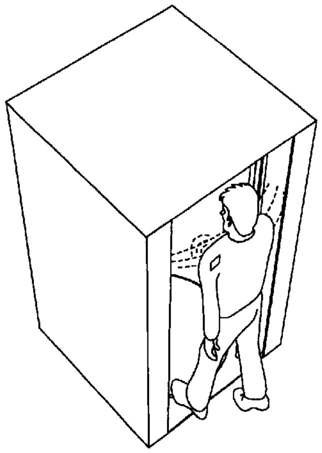
FIG. 3 is the perspective view from the top of the booth and of the authorized person which enters it in the position in which the card reader carries out the second check reading.
Figure 4:
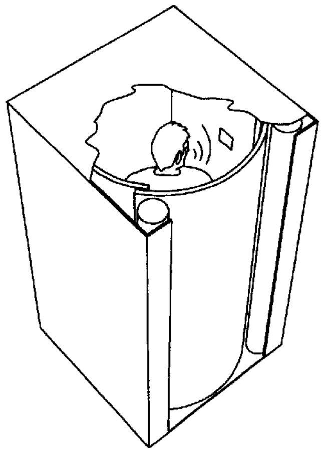
FIG. 4 is the perspective view from the top of the booth in the step in which the person undergoes the biometric voice check.
Figure 5:
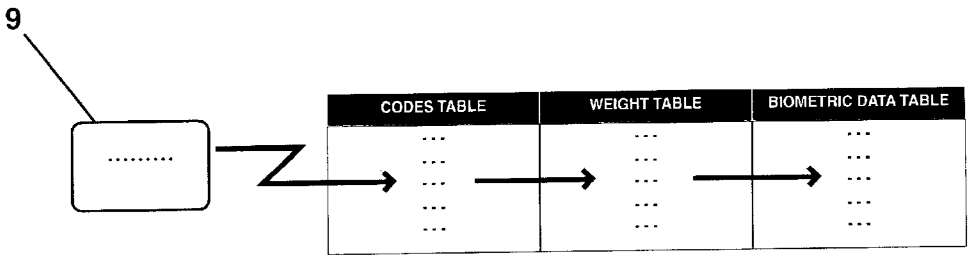
FIG. 5 shows the induction card and the memory of the programmed logic Unit in which—represented with a chart—the information of all the users authorized to pass through the booth is memorized.

It must be understood that the drawings are simply enclosed to exemplify the object of the invention without constituting in any way a limitation.

In substance, the invention consists of an armoured type structure, usually shaped like a booth 1, equipped with an entrance door 2 and an exit door 3, which are connected to a controlling mechanism which makes them interblocking type doors. They are usually activated by an adequate mechanism, and the booth's inner floor is at the very least equipped with a weighing system which can measure any change in weight when people or things are in it.

Booth 1 is also equipped with a biometric reader 5 inside it, preferably a voice reader, to avoid any physical contact between the people authorized to pass through the booth and the positioning surface, and also with a programmed logic Unit 8 to memorize the data, to compare them with the ones that are transmitted by the readers, for the management of the transit steps, for the control of the entry/exit doors and also any other apparatus the booth may be equipped with.

At its entrance, booth 1 is also equipped with means to read the identity codes of people authorized to transit. These means consist of an electromagnetic wave detector with antennas 6 and 7 which emits an electromagnetic flux that reaches the blocking line of the entrance door and the adjacent space and the induction cards 9 which are assigned to the people authorized to transit through the door, each card being marked by at least one individual identity code, make the booth a hands free type.

The programmed logic Unit 8, in the preferred carried out solution, will have at the very least previously memorized the identity codes, the weights and the biometric data of the authorized people at least. Each person will be connected with an induction card 9 which has an identity code that connects it unmistakably to the authorized person to whom the card has been assigned.

In an alternative solution to the preferred one, all or part of the information of the authorized people, identification code, weight and biometric data, may be contained in the cards assigned to the people authorized to transit through booth 1, and therefore transmitted to the programmed logic Unit 8 by the means that pick up the data at the entrance where they are compared with the corresponding values that are transmitted to the programmed logic Unit 8 by the weighing and biometric device 5 during the passage through the booth step. The induction cards 9 are usually of a passive type, that is they do not have an independent feeding system, so they are miniaturized and easily placed on the person's clothing occupying minimum space and are not visible to ill-intentioned people.

The logic behind the functioning of booth 1, is therefore the process to recognize the people authorized to transit through the controlled passage to access protected areas, requires the authorized person, holder of a personal induction card 9, to reach booth 1 and stand in front of it so that the electromagnetic field flux which joins antennas 6 and 7 reaches the induction card 9 owned by the person so that it is fed and therefore it will emit its own identification code and the information contained in it. A hands-free reading of card 9, owned by the person standing in front of the booth to verify if it is among the ones whose identification code is valid, takes place.

In the case in which the code of the induction card 9 is recognized as one of the memorized ones in the programmed logic Unit 8, the opening of door 2 is commanded by the Unit itself.

In the opposite situation, when access to the booth is attempted the presence of the induction card is ignored.

Usually, in order to verify if a non-authorized person has entered the booth 1, as soon as door 2 opens and the weight of the person in transit appears in booth 1, the second reading of the induction card 9 is ordered. If the identification code on the card is the same one read to command the opening of access door 2, the programmed logic Unit group 8 commands the subsequent logic step. In the opposite situation it means that a different person from the owner of authorised card 9 has entered and logic Unit group 8 invites the person in booth 1 to exit and therefore closes the booth again.

When the second reading corresponds with the information picked up by the first reading, the programmed logic Unit group 8 commands the closing of the access door 2 and verifies the correspondence—within a predefined tolerance—of the authorized person's memorized weight—whose induction card 9—which determined the opening of entrance door 2—with the one measured by the weighing system.

When the measured weight corresponds to the memorized one the biometric reading is carried out, usually a voice analysis of the person in booth 1. This step checks if the biometric data of the person inside booth 1 coincide with the ones previously memorized and corresponding to the holder of induction card 9 which determined the opening of booth 1 at the beginning of the crossing process.

When the identity is verified—within pre-determined limits of tolerance—the programmed logic Unit 8 commands the opening of the exit door 3 and the person can access the protected area. Booth 1 closes and resets itself to allow access to another authorized person.

Each time the reading does not give information which coincides with the expected ones, booth 1, if closed, brings door 2 to the open position and the person inside the booth is invited to exit to re-establish the initial conditions of a closed booth. In the case in which the entrance door 2 is opened and no one should enter for a programmed amount of time, i.e. no weight should be placed on the booth floor, the programmed logic Unit 8 orders the entrance door 2 to close.

Any anomaly will be signalled to security personnel.

Figure 6:
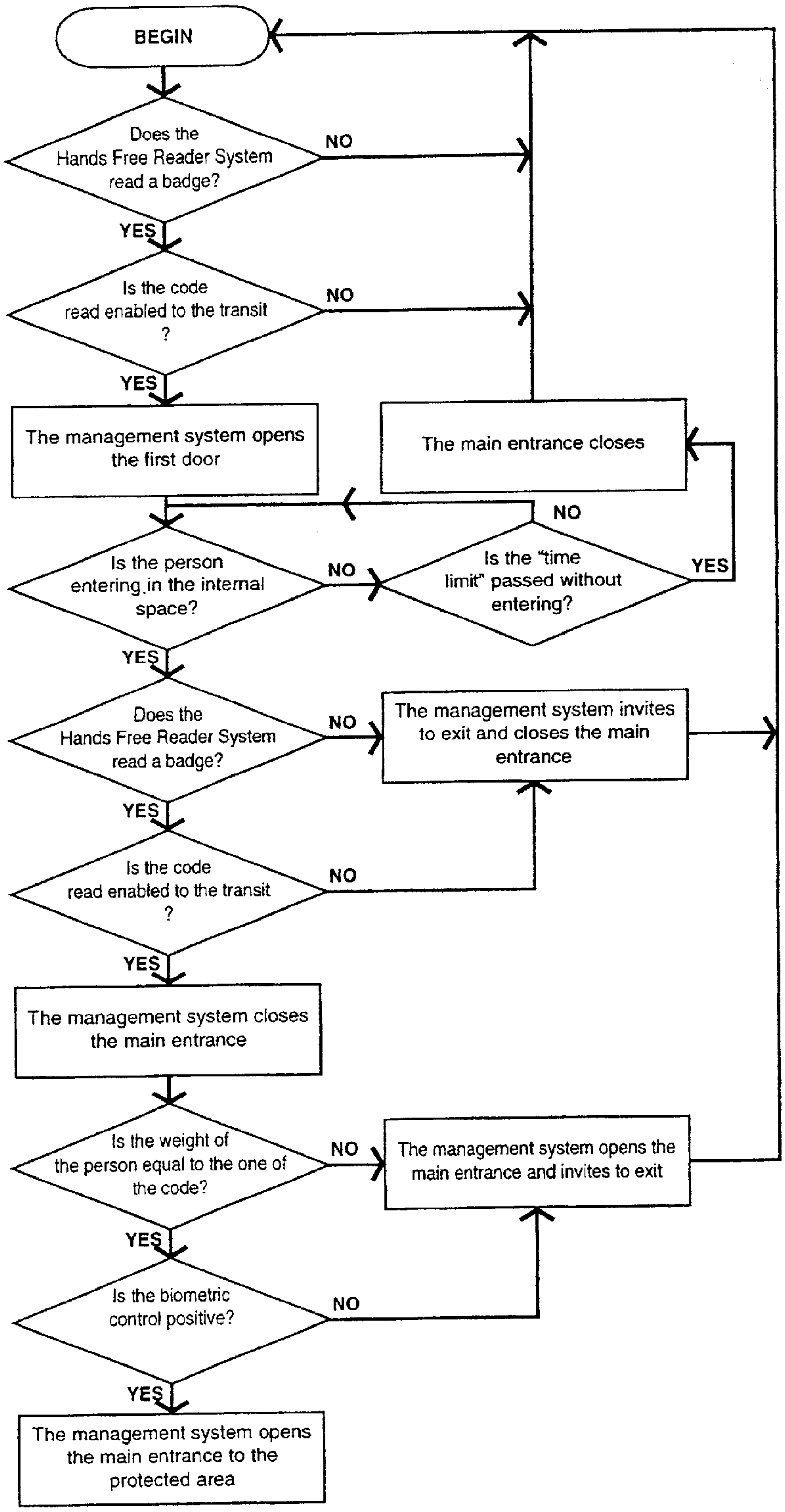
FIG. 6 shows the flow chart which exemplifies the process governing the functioning of the invention in the preferred solution.

The succession of the above described steps is represented in the flow chart of FIG. 6 that transforms into a graphical form the functional logic of the invention in the preferred solution described above.

What is claimed is:

1. In a process for the recognition of persons authorized to transit through a controlled passage to access protected areas comprising the steps of;

providing a booth having interblocking doors wherein a first booth door may be opened to admit the person carrying an identification card on which critical data including an identification code is recorded to enter the booth and the second booth door will only open to allow entry into the protected area after the person has been identified as having access to that area;

opening the said first booth door in the event that the code is verified to admit the person into the booth;

weighing the person entering into the booth to verify, with both booth doors closed, within a pre-determined tolerance, that this weight matches the weight of the authorized person who holds the identification code that allowed opening of the first booth door;

performing a biometric reading on the person in the booth and matching the results of said reading with that person's identification code; and activating said second door and auxiliary devices after a determination that the person is allowed entry, so that the person may exit the booth into the access protected area;

the improvement comprising, reading the identification code of the person in a hands-free manner utilizing an electromagnetic wave detector and antennas associated with the booth while the person is outside of and in close proximity to the booth in order to verify if the code is among those authorized to enter said area, to activate the opening of the entry door;

a second reading of the identification code being made when the person is stepping into the booth and the weighing means begin to be activated, in order to verify that the entering person is the one carrying the authorized card and, if the two readings coincide, to activate the closing of the entry door.

2. The process as set forth in claim 1, wherein the time from the opening of the first door of the booth is measured, and if no weight is detected in the weighing step after a predetermined interval, the first door is again closed.

3. In a booth with interblocking separately operable entry and exit doors and provided with a floor comprising, in combination; first reading means to identify an identification code card carried by a person desiring entry to said booth, a pre-programmed logic unit in communication with said detector which stores critical information concerning the identity of users and which compares this information to information received from said detector to control the operation of the doors of the booth, means in association with the floor of said booth for weighing the person gaining entry through said entry door, biometric reading means in said booth for detecting critical information concerning the identity of the user, whereby when said identity of the person gaining entry to the booth is confirmed, said exit door will open allowing the user to gain entry to an area beyond said booth, the improvement comprising an electromagnetic wave transmitter and detector including antenna means located near the entry door to send and receive electromagnetic waves for interrogation of persons located in proximity to the entry door to activate the opening of said entry door and when the person is entering the booth through said entry door to activate the second reading of said card, and if the two readings coincide, to activate the closing of said entry door, and adopted to detect and to read the identification code without the person needing to use his hands to allow said readings.

4. The booth as defined in claim 3, wherein weight and biometric data relating to the identity of an authorized user are recorded on said identification card so that after reading and comparison of said data when both doors are closed, proper authentication will cause opening of the exit door of the booth.

5. The booth as defined in claim 3, wherein the biometric reading means and data relate to voice patterns and recognition.

6. The booth as defined in claim 3, wherein the identification card is an induction card of the passive type and of such a size as not to be visible when being carried by the authorized user.

* * * * *